UNITED STATES PATENT OFFICE 2,439,239

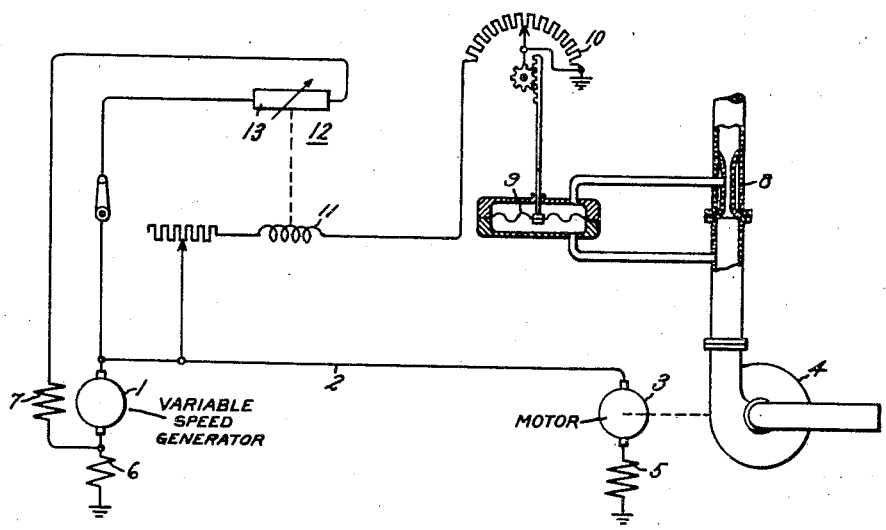

CABIN SUPERCHARGER REGULATOR SYSTEM

Frederick E. Crever, Scotia, N. Y., assignor to General Electric Company, a corporation of New York Application April 12, 1945, Serial No. 588,007

6 Claims. (Cl. 230—12)

This invention relates to regulator systems and more particularly to improvements in regulators for aircraft cabin superchargers.

It is desirable to supercharge the cabin of high altitude aircraft in order to increase the comfort of the crew and passengers and it is desirable to provide the supercharging system with automatic control so that, for example, the cabin air pressure may be maintained substantially constant with wide variations in outside atmospheric pressure which accompany changes in altitude.

The air compressor, blower or supercharger usually may be driven by an electric motor which is energized from the aircraft generator which ordinarily is driven directly by the aircraft engine and therefore is driven over a relatively wide range of speed. A convenient way of regulating the supercharger output is to provide an air flow responsive device which controls the generator excitation so as to vary the generator voltage and thus vary the speed and power output of the motor which drives the supercharger with the result that the air flow output of the supercharger is maintained substantially constant. However, with such a system the supercharger regulator must also correct for the variations in generator voltage which are caused by variations in generator speed with the result that the supercharger regulator must have an excessively wide range of control.

In accordance with this invention there is provided a novel and simple system in which the changes in generator voltage which are produced by any and all changes in generator operating conditions are automatically eliminated by means of an automatic voltage regulator provided for this purpose. Therefore, the supercharger regulator is relieved of performing this regulating function and it need only control the generator voltage enough to satisfy the particular condition which it controls.

It will be noted that the above circuit includes a Ward Leonard system in that the operation of the motor is controlled by varying the excitation and hence the voltage of the generator which supplies the motor current and therefore the invention in its broader aspects comprises a Ward Leonard system having a variable speed generator in which a function of the motor load is automatically maintained constant by a regulator provided for this purpose, and in addition, other regulating means is provided for preventing variations in generator voltage as a result of variations in generator speed.

An object of the invention is to provide a new and improved regulating system.

Another object of the invention is to provide a new and improved Ward Leonard type control system.

A further object of the invention is to provide a new and improved cabin supercharger regulator.

The invention will be better understood from the following description taken in connection with the accompanying drawing and its scope will be pointed out in the appended claims.

Referring now to the single figure of the accompanying drawing, there is shown therein a generator 1 which may be of any suitable type such as a direct current aircraft engine-driven variable speed generator. This generator is connected by a circuit 2 which energizes a motor 3 which in turn drives a supercharger or air compressor 4. The motor may be of any suitable type and, as shown, it is a series motor having a field winding 5, although it will be understood that this motor may equally well have a separately excited field winding.

The generator 1 is preferably provided with a compounding series winding 6 and it also is provided with a control field winding 7 which may either be shunt connected or separately excited, the former being shown.

The system is automatically regulated so as to supply a constant mass flow of air to an aircraft cabin under pressure conditions dependent upon the operation of an outlet valve (not shown) from the cabin. This can be done by means of a pressure regulator which maintains constant pressure difference between two points in a Venturi tube 8 and which controls the energization of the field winding 7 of the generator so as to produce this result. As shown, the two spaced points in the Venturi tube 8 are connected by tubes to opposite sides of a diaphragm 9 which is mechanically connected to a rheostat 10.

However, instead of having the rheostat 10 connected directly to control the field winding 7 this rheostat is connected to control a main control element 11 for an automatic voltage regulator 12 for the generator 1. As shown, the main control element is an electromagnet and the rheostat 10 is connected in series with the main control electromagnet 11 across the generator-armature. The control electromagnet 11 is mechanically connected to actuate a rheostat 13 which is connected to control the energization of the field winding 7. As shown, the rheostat 13 is serially connected with the field winding 7.

The operation of the illustrated embodiment of the invention is as follows: Under steady or unchanging operating conditions in which the outside air pressure remains constant and the generator speed remains constant, the rheostat 10 will permit sufficient current to flow through the control element 11 to cause the rheostat 13 to allow sufficient current to flow through the field winding 7 to produce the proper generator voltage for driving the motor 3 and in turn the supercharger 4 at the proper speed to maintain the desired supercharger air flow output. If the outside air pressure changes there will be a relative change in pressure on the sides of the diaphragm 9, thus causing the rheostat 10 to change its resistance which in turn changes the setting of the voltage regulator 12 so as to change the voltage of the generator 1 in the proper direction to return the pressure on the diaphragm 9 to the proper value corresponding to the desired air flow through the Venturi tube 8.

If now there is a change in generator speed, the resulting change in voltage will immediately be communicated to the main control coil 11 as this is connected in a circuit across the generator-armature so that the voltage regulator will automatically change the resistance value of the rheostat 13 to restore the generator voltage to normal very quickly and in fact to prevent, for all practical purposes, any material change in generator voltage as a result of changes in generator speed.

While there has been shown and described a particular embodiment of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States, is:

1. In combination, a variable speed electric generator, a motor connected to be energized by said generator, a mechanical load driven by said motor, an automatic rheostatic voltage regulator for maintaining constant output voltage of said generator, and means responsive to a function of the operation of said load for modifying the voltage setting of said generator voltage regulator.

2. In combination, an aircraft engine-driven generator which operates over a relatively wide speed range, a cabin supercharger, a motor energized by said generator for driving said supercharger, an automatic voltage regulator for said generator for maintaining said generator voltage substantially constant, and automatic means responsive to the air flow output of said supercharger for modifying the voltage setting of said regulator so as to maintain substantially constant air flow.

3. In combination, a motor-driven cabin supercharger for aircraft, a variable speed generator for energizing said motor, means responsive to the air flow through said supercharger for varying the excitation of said generator so as to maintain substantially constant air flow, and additional means for automatically maintaining constant the voltage in said generator substantially independent of its speed.

4. In combination, a Ward Leonard system having a variable speed generator, a resistance regulator for automatically maintaining substantially constant generator voltage with variations in speed, and means responsive to the function of the motor load for varying the voltage setting of said regulator so as automatically to make said function substantially constant throughout wide variations in generator speed and motor speed.

5. In combination, a variable speed electric generator, a motor connected to be energized by said generator, a mechanical load driven by said motor, an automatic voltage regulator for said generator, a voltage sensitive operating element for said voltage regulator, and means responsive to a function of said motor load for varying the voltage applied to said voltage sensitive operating element to maintain said function substantially constant.

6. In combination, an air craft engine driven generator, a cabin supercharger, a motor energized by said generator and driving said supercharger, an automatic generator voltage regulator having a voltage sensitive operating element, and automatic means responsive to the air flow output of said supercharger for varying the voltage applied to the voltage sensitive element of said regulator so as to maintain substantially constant said air flow output.

FREDERICK E. CREVER.

REFERENCES CITED

The following references are of record in the file of this patent:

UNITED STATES PATENTS

| Number | Name | Date |
|---|---|---|
| 1,060,208 | Osborne | Apr. 29, 1913 |
| 1,531,592 | Boddie | Mar. 31, 1925 |
| 1,579,038 | Smoot | Mar. 30, 1926 |
| 1,924,190 | Kuehnsted | Aug. 29, 1933 |
| 2,011,655 | Schaelchlin et al. | Aug. 20, 1935 |
| 2,022,535 | Byles et al. | Nov. 26, 1935 |
| 2,298,977 | Silber et al. | Oct. 13, 1942 |
| 2,367,981 | Walley | Jan. 23, 1945 |